C. E. DROWN.
PACKING RING.
APPLICATION FILED MAR. 1, 1910.

962,820.

Patented June 28, 1910.

WITNESSES:
J. A. Brophy
Amos W. Hart

INVENTOR
Curtis E. Drown
BY
ATTORNEYS

UNITED STATES PATENT OFFICE.

CURTIS E. DROWN, OF TUCSON, ARIZONA TERRITORY.

PACKING-RING.

962,820.  Specification of Letters Patent.  Patented June 28, 1910.

Application filed March 1, 1910. Serial No. 546,755.

*To all whom it may concern:*

Be it known that I, CURTIS E. DROWN, a citizen of the United States, and a resident of Tucson, in the county of Pima and Territory of Arizona, have invented a new and Improved Packing-Ring, of which the following is a full, clear, and exact description.

This invention relates to packing rings, and more particularly to such as are resilient in construction and which serve to keep the packing of pistons or the like firmly in position.

The object of the invention is to provide a device of the class described, simple and serviceable in construction and inexpensive to manufacture, which is provided with an outwardly disposed flange, the latter engaging the packing to prevent it from becoming displaced or from losing its shape.

Reference is to be had to the accompanying drawings forming a part of this specification, in which similar characters of reference indicate corresponding parts in all the views.

Figure 3:
Figure 2:
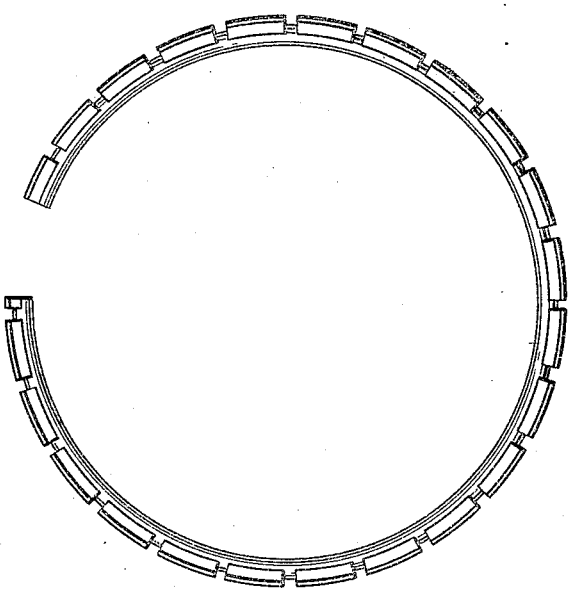
Figure 1:
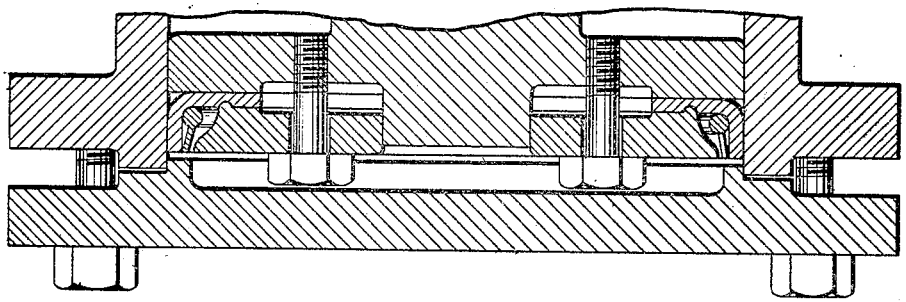

Figure 1 is a cross section of a cylinder head showing an embodiment of my invention, applied to the piston head; Fig. 2 is a plan view of my invention; and Fig. 3 is a cross section on the line 3—3 of Fig. 2.

In the specific form shown in the drawings, 1 represents a cylinder head of common form, which is secured to the wall 2 of the cylinder by means of bolts 3, having nuts 4. A piston 5 having a head 6 is located within the cylinder, the head being provided with an annular ring 7 removably secured in a suitable annular recess 7ª by means of bolts 8 or the like, the latter being received in threaded openings 9. The ring 7 has a rib 10 on its inner side, which engages an annular cup-shaped packing 11 of any suitable material, such as leather or the like. The packing is thus firmly clamped between the ring 7 and the piston head, its outwardly disposed portion 12 resting against the inner wall of the cylinder.

I provide a resilient filling ring 13 substantially annular in form, and having an outwardly disposed flange 14, which is preferably divided into a plurality of sections. As shown in Fig. 1, the ring 13 is adapted to be arranged around the ring 7 so that it will rest on the packing 11, at the angle thereof, the flange 14 serving to engage the outwardly disposed portion 12 of the packing to hold the latter in place against the cylinder wall, and also to prevent the packing from becoming disturbed. This flange is of importance, inasmuch as it prevents the packing from losing its shape, as often happens when a ring of the common form generally used, is employed.

It should be understood that I do not limit myself to the particular construction shown in the drawings, as others equally advantageous may be employed without departing from the spirit or the scope of the invention.

Having thus described my invention, what I claim as new and desire to secure by Letters Patent is:

A piston head having a reduced end, a packing ring arranged against the end of the head and normally projecting beyond the peripheral surface thereof, a clamping ring engaging the inner edge of the packing ring and a filler consisting of a ring resting against the outer face of the packing ring, outside of the clamping ring, and provided with resilient fingers engaging the packing for the purpose set forth.

In testimony whereof I have signed my name to this specification in the presence of two subscribing witnesses.

CURTIS E. DROWN.

Witnesses:
 A. A. WORSLEY,
 JOHN M. FEIER.